(12) United States Patent
Jana et al.

(10) Patent No.: US 10,413,127 B1
(45) Date of Patent: Sep. 17, 2019

(54) COFFEE GRINDER

(71) Applicant: Jana Media, LLC, Seabrook, TX (US)

(72) Inventors: Raj Jana, Seabrook, TX (US); Thomas Hazzard, Irvine, CA (US)

(73) Assignee: Jana Media, LLC, Cheyenne, WY (US)

( * ) Notice: Subject to any disclaimer, the term of this patent is extended or adjusted under 35 U.S.C. 154(b) by 263 days.

(21) Appl. No.: 15/661,245

(22) Filed: Jul. 27, 2017

(51) Int. Cl.
*A47J 42/00* (2006.01)
*A47J 42/08* (2006.01)
*A47J 42/38* (2006.01)
*A47J 42/02* (2006.01)
*A47J 42/10* (2006.01)

(52) U.S. Cl.
CPC ............... *A47J 42/08* (2013.01); *A47J 42/02* (2013.01); *A47J 42/10* (2013.01); *A47J 42/38* (2013.01)

(58) Field of Classification Search
CPC .. A47J 42/38; A47J 42/02; A47J 42/10; A47J 42/08
See application file for complete search history.

(56) References Cited

U.S. PATENT DOCUMENTS

| | | | | |
|---|---|---|---|---|
| 2,671,617 A | * | 3/1954 | Talge | A47J 42/04 220/324 |
| 4,135,672 A | * | 1/1979 | Schlessel | A47J 42/04 241/169.1 |
| 5,845,857 A | * | 12/1998 | Haber | A47J 42/40 241/81 |
| 6,224,005 B1 | * | 5/2001 | Wu | A47J 42/10 241/169.1 |
| 6,851,635 B2 | | 2/2005 | McCowin | |
| 8,534,579 B2 | * | 9/2013 | Carapelli | A47J 42/08 241/168 |
| 9,277,838 B2 | | 3/2016 | de Graaff et al. | |
| 9,578,989 B2 | | 2/2017 | Laegdsgaard | |
| 2010/0308141 A1 | * | 12/2010 | Bich | A47J 42/02 241/30 |
| 2012/0273600 A1 | * | 11/2012 | Carapelli | A47J 42/08 241/85 |
| 2013/0056567 A1 | * | 3/2013 | Lee | A47J 42/02 241/24.26 |
| 2014/0312152 A1 | | 10/2014 | Pai | |
| 2016/0015214 A1 | * | 1/2016 | Lægdsgaard | A47J 42/10 241/259 |
| 2016/0045070 A1 | * | 2/2016 | Sahli | A47J 31/42 241/257.1 |
| 2016/0045071 A1 | | 2/2016 | Sahli et al. | |

* cited by examiner

*Primary Examiner* — Faye Francis
(74) *Attorney, Agent, or Firm* — Eric Karich; Karich & Associates

(57) ABSTRACT

A coffee grinder has a housing that includes a ring burr, a shaft extending through the ring burr, a frustoconical burr, and an interlocking plug. An internal bore of the frustoconical burr has an upper cylindrical surface adjacent the top end, an interlocking portion adjacent the bottom edge, and a tapered side surface. The interlocking plug is shaped to extend through the internal bore of the frustoconical burr, and includes an upper cylindrical portion that fits through the upper cylindrical surface, and a lower portion that includes a sidewall surface which is also tapered such that the sidewall surface interlocks with the side surface of the frustoconical burr.

11 Claims, 2 Drawing Sheets

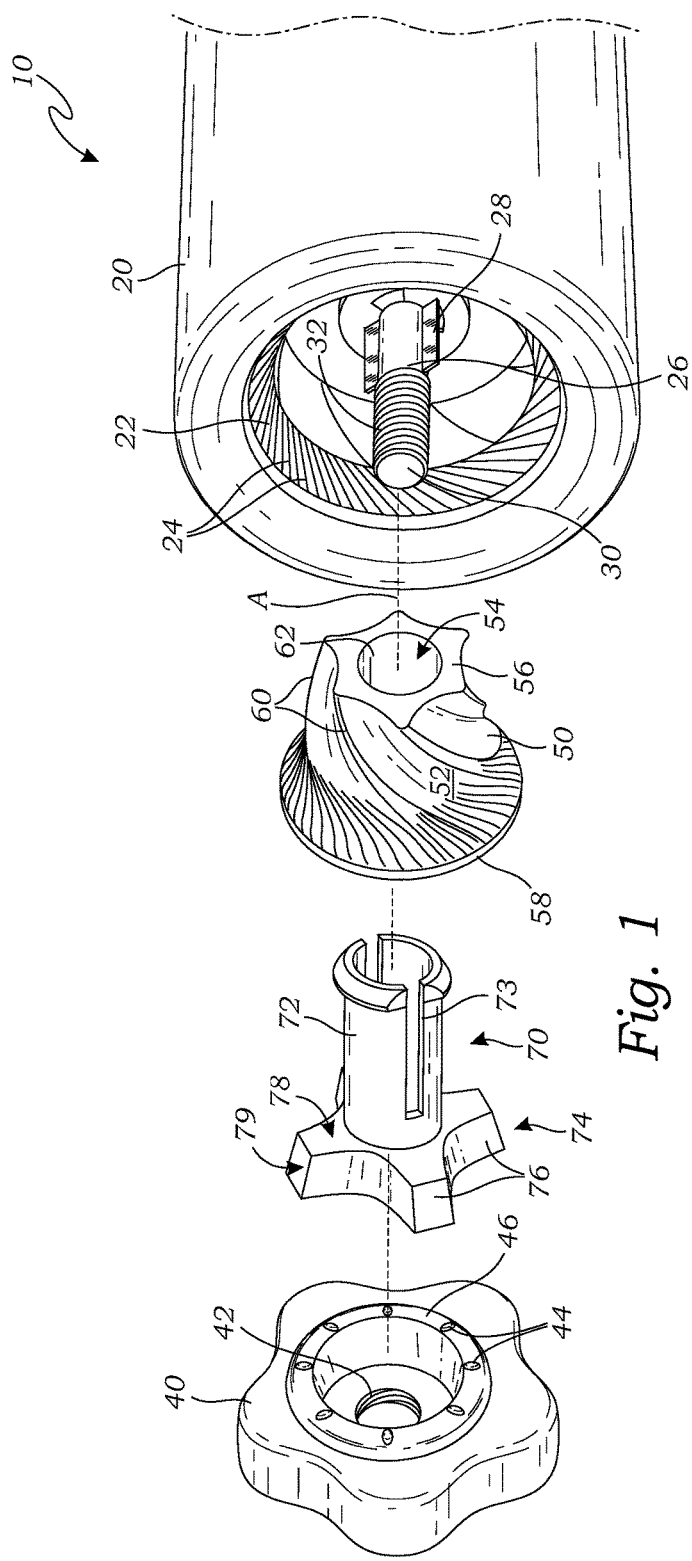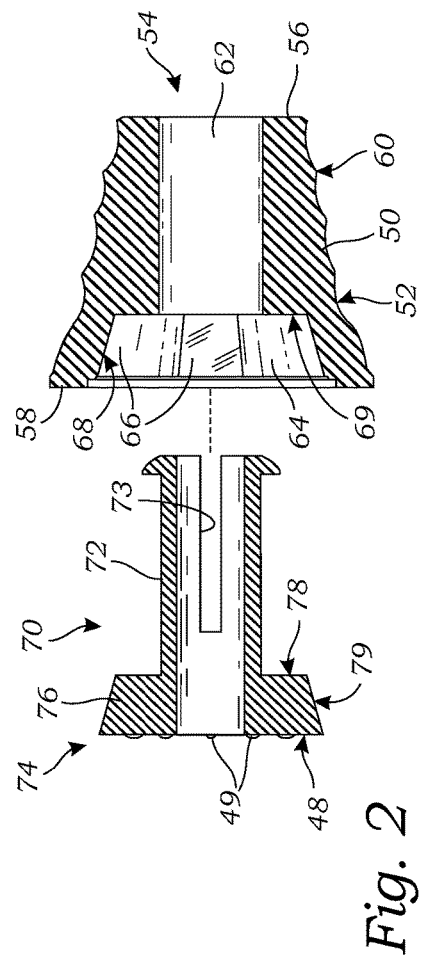

COFFEE GRINDER

BACKGROUND OF THE INVENTION

Field of the Invention

This invention relates generally to coffee grinders, and more particularly to a coffee grinder that includes an interlocking plug that engages a frustoconical burr with exceptional rigidity, to ensure consistent grinding results.

Description of Related Art

Various coffee grinders include interlocking plugs which interconnect a frustoconical burr with a shaft of the coffee grinder. Pai, U.S. 2014/0312152, for example, illustrates an interlocking plug that includes outwardly extending gears which is similar to the present invention.

However, in Pai (and similar grinders), the interlocking plugs include gears that have side surfaces that are flat (i.e., extend parallel to the axis of the shaft).

The problem with this construction is that there is a lot of "play" or "wiggle" between the interlocking plug and the frustoconical burr, especially given the significant tolerances allowed for these types of parts. When there is a lot of movement between the parts, then the frustoconical burr tends to get pushed out of alignment during the grinding process, resulting in some coffee beans being ground into powder (i.e., into fragments that are too small), while others are not ground enough. This results in less desirable coffee, where consistency is important.

One reference, Laegdsgaard, U.S. Pat. No. 9,578,989, teaches a gear with tapered side surfaces (i.e., angled with respect to the axis of the shaft). However, the center post of the interlocking plug has a frustoconical shape, rather than the cylindrical post used in the present invention and in the prior art such as Pai. While the Laegdsgaard reference includes tapered side surfaces, these side surfaces will still sometimes not engage properly, because the tapered center post will engage first and prevent proper seating of the side surfaces.

The prior art teaches coffee grinders that include interlocking plugs with flat side surfaces, and the prior art teaches interlocking plugs with tapered side surfaces and also tapered (frustroconical) center posts. However, the prior art does not teach a construction which includes both tapered side surfaces, as well and a cylindrical center post, which together ensure the proper seating of the side surfaces of the gears against the frustoconical burr. The present invention fulfills these needs and provides further advantages as described in the following summary.

SUMMARY OF THE INVENTION

The present invention teaches certain benefits in construction and use which give rise to the objectives described below.

The present invention provides a coffee grinder comprising a housing that includes a ring burr; a shaft extending through the ring burr, the shaft having an axis of rotation; and a frustoconical burr having an external surface, and an internal bore that extends from a top end to a bottom end. The internal bore has an upper cylindrical surface adjacent the top end, and an interlocking portion adjacent the bottom edge which includes a side surface which is tapered with respect to the axis of the shaft. An interlocking plug is shaped to extend through the internal bore of the frustoconical burr, and includes an upper cylindrical portion that fits through the upper cylindrical surface, and a lower portion that includes a sidewall surface which is also tapered with respect to the axis of the shaft, such that the sidewall surface interlocks with the side surface of the frustoconical burr. An adjustment knob engages the end of the shaft for locking the interlocking plug within the frustoconical burr.

A primary objective of the present invention is to provide a coffee grinder having advantages not taught by the prior art.

Another objective is to provide a coffee grinder that includes an interlocking plug with tapered side surfaces, and a cylindrical upper portion, which together enables a more secure engagement between the interlocking plug and a frustoconical burr.

Another objective is to provide a coffee grinder that includes an interlocking plug and a frustoconical burr which may accommodate greater manufacturing tolerances and still form a suitably secure interconnection, thereby increasing quality and reducing waste.

A further objective is to provide a coffee grinder that has less "play" or "wiggle" between the interlocking plug and the frustoconical burr.

A further objective is to provide a coffee grinder that provides superior grinding performance, with more consistent production of coffee of the correct grind size.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIG. 1 is an exploded perspective view of a coffee grinder according to one embodiment of the present invention, illustrating a grinding assembly that includes a ring burr, a frustoconical burr, an interlocking plug, and an adjustment knob;

FIG. 2 is an exploded side sectional view of the frustoconical burr and the interlocking plug;

DETAILED DESCRIPTION OF THE INVENTION

Figure 3:
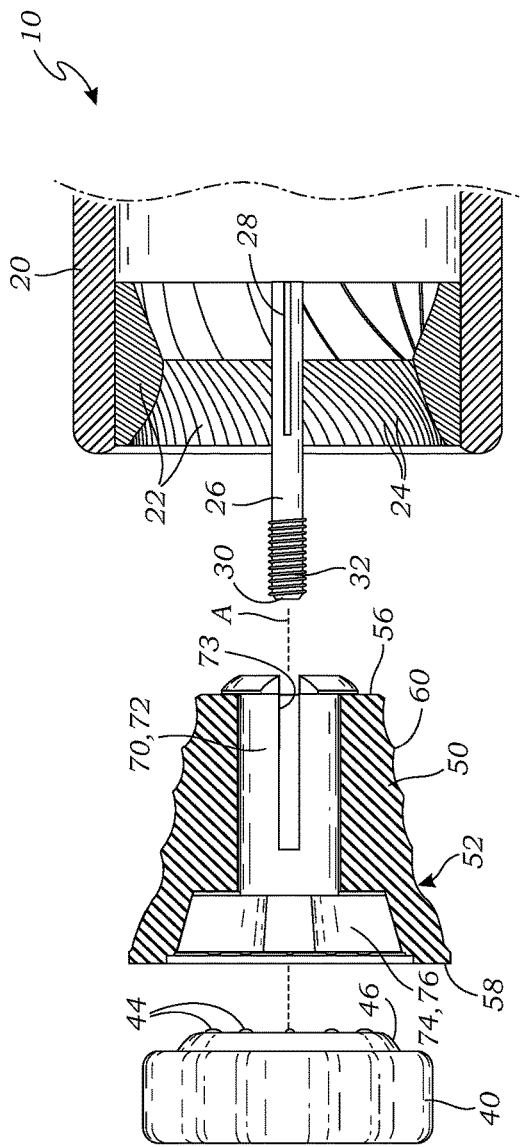
FIG. 3 is a partially exploded side sectional view of the partially assembled coffee grinder of FIG. 1, illustrating the frustoconical burr mounted on the interlocking plug.

The above-described drawing figures illustrate the invention, a coffee grinder for grinding coffee beans.

FIG. 1 is an exploded perspective view of a coffee grinder 10 according to one embodiment of the present invention, illustrating a grinding assembly that includes a ring burr 22, a frustoconical burr 50, an interlocking plug 70, and an adjustment knob 40. As shown in FIG. 1, the ring burr 22 is mounted in a tubular housing 20, and includes a first plurality of curved teeth 24. The frustoconical burr 50 includes a second plurality of curved teeth 60, and the combination of the first and second pluralities of curved teeth 24 and 60 cooperate to grind coffee beans that are run through the coffee grinder 10.

As shown in FIG. 1, the tubular housing 20 may have a cylindrical shape as shown, or may have another crosssectional shape. The particular shape of the housing 20 is not critical to the present invention, so long as it is suitable for holding the ring burr 22 and other components, as discussed in greater detail below.

Also shown in FIG. 1, the coffee grinder 10 further includes an interlocking plug 70 that engages a shaft 26 of the coffee grinder 10, and also engages the frustoconical burr 50, so that rotation of the shaft 26 causes the frustoconical burr 50 to also rotate with respect to the ring burr 22, for grinding the coffee beans. The shaft 26 is part of a crank mechanism (not shown), and extends through the ring burr 22. The shaft 26 having an axis A about which it rotates to turn an interlocking feature 28, which is adapted to engage the interlocking plug 70. A mating feature 73 of an upper cylindrical portion 72 of the interlocking plug 70 engages the interlocking feature 28 of the shaft 26 to prevent rotation of the interlocking plug 70 with respect to the shaft 26, so that rotation of the shaft 26 causes the interlocking plug 70 to also rotate. In this embodiment, the mating feature 73 is in the form of slots, and the interlocking feature 28 of the shaft 26 includes outwardly extending flanges (in this case, a pair of opposed flanges). In alternative embodiments, these features may be reversed, or other similar features or structures may be used. For example, other forms of protrusions, interlocking features, etc., may be used; or the shaft 26 may have a non-circular cross-section, and the interlocking plug 70 may have a structure to engage this shaped outer surface; or any form of male/female engagement, or other equivalent interlocking structures may be used, and such alternatives should be considered within the scope of the present invention.

As shown in FIG. 1, the shaft 26 extends to an end 30 that has an externally threaded outer surface 32. The adjustment knob 40 has an internally threaded aperture 42 that threadedly engages the externally threaded outer surface 32 of the shaft 26 for locking, via the adjustment knob 40, the interlocking plug 70 within the frustoconical burr 50, and the frustoconical burr 50 within the ring burr 22. Rotation of the adjustment knob 40 also functions to adjust the distance between the ring burr 22 and the frustoconical burr 50, for adjusting the size of the coffee grounds (i.e., a tighter fit results in more finely ground coffee).

In this embodiment, as shown in FIG. 1, the adjustment knob 40 includes a plurality of bumps 44 (e.g., raised portions, ridges, grooves, slots, etc.) that are radially spaced around the internally threaded aperture 42. The bumps 44 may be disposed on an annular ridge 46 that is coaxially disposed around the internally threaded aperture 42. Similarly, a bottom surface 48 of the interlocking plug 70 (shown in FIG. 2) may include similar bumps 49, arranged so that when the adjustment knob 40 is mounted on the shaft 26 and turned, the bumps 44 and the similar bumps 49 create a tactile feedback through the adjustment knob, so that the user can more readily judge the amount of tightening/loosening that is being performed.

Critical to the present invention, as discussed in greater detail below, outer sidewall surfaces 79 of the interlocking plug 70 are tapered in a particular manner to firmly frictionally engage the frustoconical burr 50 and prevent lateral movement of the frustoconical burr 50 with respect to the ring burr 22. This firm engagement establishes a distance between the frustoconical burr 50 and the ring burr 22 which may be adjusted (via rotation of the adjustment knob), but which has limited variance caused by stresses arising from the grinding process. This secure fitting, despite ordinary variances arising during manufacturing processes, is essential to consistent grinding results. If the frustoconical burr 50 and the interlocking plug 70 do not engage correctly, the resulting "play" or "wiggle" between the parts will result in changed in the distance between the frustoconical burr 50 and the ring burr 22, resulting in coffee that is sometimes ground too fine, and sometimes not ground enough.

FIG. 2 is an exploded side sectional view of the frustoconical burr 50 and the interlocking plug 70. FIG. 3 is a partially exploded side sectional view of the partially assembled coffee grinder 10 of FIG. 1, illustrating the frustoconical burr 50 mounted on the interlocking plug 70. As shown in FIGS. 1-3, the frustoconical burr 50 has an external surface 52, and an internal bore 54 that extends from a top end 56 to a bottom end 58. The external surface 52 has a second plurality of curved teeth 60, which interact with the first plurality of curved teeth 24 (best shown in FIG. 1), for grinding the coffee. Any form of structure that grinds coffee beans suitably may be used, and should be considered within the scope of the term "teeth." The details of these teeth are known in the art, and are therefore not described in greater detail herein.

As shown in FIGS. 1-3, the internal bore 54 has an upper cylindrical surface 62 adjacent the top end 56, and an interlocking portion 64 adjacent the bottom edge 58. Importantly, the upper cylindrical surface 62 is coaxial with the axis A of the shaft 26, similar to an upper cylindrical portion 72 of the interlocking plug 70, so that these two parts do not interlock to prevent longitudinal movement of the frustoconical burr 50 with respect to the interlocking plug 70. This is described in greater detail below.

As shown in FIGS. 2-3, the interlocking portion 64 of the frustoconical burr 50 may include a plurality of receivers 66 (e.g., gear-receivers) which each include a side surface 68 and a top surface 69. The side surface 68 of each of the receivers are tapered, i.e., angled with respect to the axis A of the shaft 26, to properly engage the interlocking plug 70, as described below. In this embodiment, the plurality of receivers 66 are in the form of four outwardly extending bores; however, other numbers of receivers may be used, and alternative forms of structures may be used, as long as they suitably engage with the interlocking plug 70, as described below.

As shown in FIGS. 1-3, the interlocking plug 70 is shaped to extend through the internal bore 54 of the frustoconical burr 50. The interlocking plug 70 includes the upper cylindrical portion 72 described above, which fits through the upper cylindrical surface 62 of the frustoconical burr 50. Since both are cylindrical, and coaxially aligned, they do not lockingly engage each other, but slide through each other, and therefore do not limit the proper engagement of the interlocking plug 70 and the frustoconical burr 50. As discussed above in the Background of the invention, this is a critical improvement over Laegdsgaard, which includes a tapered upper construction.

The interlocking plug 70 further includes a lower portion 74 that interlocks with the interlocking portion 64 of the frustoconical burr 50. In this embodiment, the lower portion 74 includes a plurality of interlocking feet 76 (e.g., gears) that each extend radially and interlock with one of the receivers 66 of the frustoconical burr 50. In this embodiment, each of the interlocking feet 76 has a top surface 78 and a sidewall surface 79.

While the top surfaces 69 and 78 may be generally formed on a plane from which the axis A of the shaft 26 is orthogonal, the sidewall surface 79 is tapered, i.e., angled with respect to the axis A of the shaft 26, such that the sidewall surfaces 79 of the interlocking feet 76 together engage the side surfaces 68 of the plurality of receivers 66 of the frustoconical burr 50 to securely lock the frustoconical burr 50 onto the interlocking plug 70. This secure engagement, best shown in FIG. 3, prevents lateral movement of the frustoconical burr 50 with respect to the interlocking plug 70 interlocking plug 70. In this configuration, the top surfaces 78 of the interlocking feet 76 do not contact the frustoconical burr 50, because the physical engagement occurs via the sidewall surfaces 79.

It is important to the present invention that the sidewall surfaces 79 of the interlocking feet 76 are tapered or angled so that when the frustoconical burr 50 is mounted on the interlocking plug 70, these surfaces form a secure engagement. It is similarly important that the upper cylindrical portion 72 of the interlocking plug 70 and the upper cylindrical surface 62 of the frustoconical burr 50 are generally coaxial to each other and to the shaft 26 so that these surfaces to not engage one another and prevent proper engagement of the sidewall surface 79 and the side surface 68.

Similarly, as shown in FIGS. 1-3, in this embodiment the top surfaces 69 and 78 do not contact each other when the interlocking plug 70 is seated in the frustoconical burr 50. In these Figures, the element numbers are best shown in FIG. 2, but the actual spacing is best shown in FIG. 3.

Figure 4:
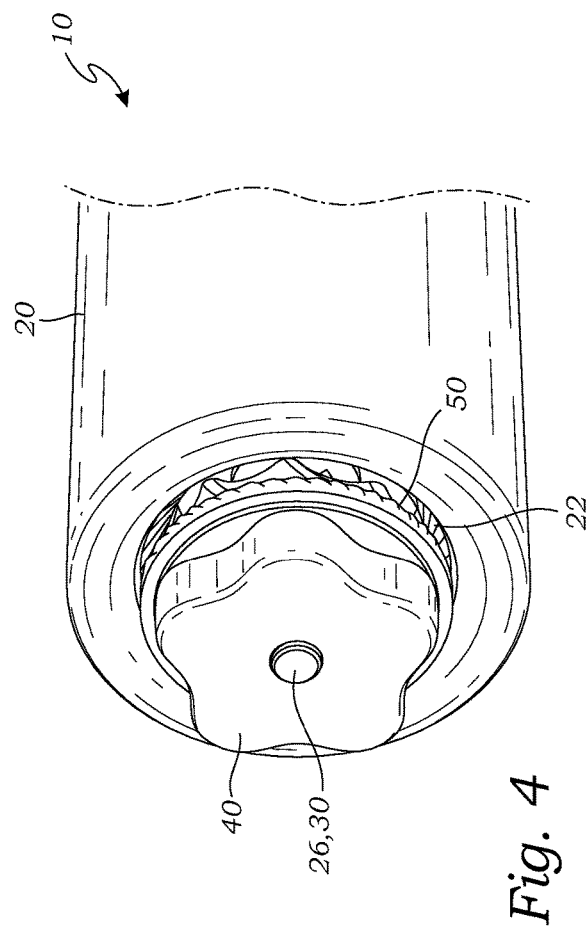
FIG. 4 is a perspective view of the coffee grinder of FIG. 1, once it has been assembled.

FIG. 4 is a perspective view of the coffee grinder 10 of FIG. 1, once it has been assembled. As shown in FIG. 4, the coffee grinder 10, once assembled, may be used to grind coffee, which ground coffee (not shown) exits the spaces between the frustoconical burr 50 and the ring burr 22.

As used in this application, the words "a," "an," and "one" are defined to include one or more of the referenced item unless specifically stated otherwise. The terms "approximately" and "about" are defined to mean +/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by the following claims.

What is claimed is:

1. A coffee grinder comprising:
a housing that includes a ring burr having a first plurality of curved teeth;
a shaft extending through the ring burr, the shaft having an axis, an interlocking feature, and the shaft extends to an end;
a frustoconical burr having an external surface with a second plurality of curved teeth;
an internal bore of the frustoconical burr that extends from a top end to a bottom end, the internal bore having an upper cylindrical surface adjacent the top end, and an interlocking portion adjacent the bottom edge, the upper cylindrical surface being coaxial with the axis of the shaft, the interlocking portion having a side surface which is tapered with respect to the axis of the shaft;
an interlocking plug shaped to extend through the internal bore of the frustoconical burr, the interlocking plug having an upper cylindrical portion that fits through the upper cylindrical surface, and a lower portion that includes a sidewall surface which is also tapered with respect to the axis of the shaft, such that the sidewall surface interlocks with the side surface of the frustoconical burr;
a mating feature of the upper cylindrical portion of the interlocking plug that engages the interlocking feature of the shaft to prevent rotation of the interlocking plug with respect to the shaft; and
an adjustment knob that engages the end of the shaft for locking the interlocking plug within the frustoconical burr, and the frustoconical burr within the ring burr.

2. The coffee grinder of claim 1, wherein the interlocking portion of the frustoconical burr includes a top surface, wherein the lower portion of the interlocking plug also includes a top surface, and the top surfaces do not contact each other when the interlocking plug is seated in the interlocking portion of the frustoconical burr.

3. The coffee grinder of claim 1, wherein the tubular housing is cylindrical.

4. The coffee grinder of claim 1, wherein the interlocking portion of the frustoconical burr further includes a plurality of receivers which extend radially outwardly.

5. The coffee grinder of claim 4, wherein the lower portion of the interlocking plug further includes a plurality of feet which extend radially outwardly.

6. The coffee grinder of claim 5, wherein each of the plurality of feet fit into and securely engage one of the plurality of receivers.

7. The coffee grinder of claim 1, wherein the interlocking feature of the shaft includes a pair of flanges which extend radially outwardly from the shaft.

8. The coffee grinder of claim 7, wherein the mating feature of the upper cylindrical portion of the interlocking plug includes a pair of slots, and wherein each of the flanges of the shaft slidably engages one of the pair of slots.

9. The coffee grinder of claim 1, wherein the adjustment knob includes an annular ridge that is coaxially disposed around an internally threaded aperture, and wherein the annular ridge includes a plurality of bumps that are radially spaced around the annular ridge.

10. A coffee grinder comprising:
a housing that includes a ring burr;
a shaft extending through the ring burr, the shaft having an axis of rotation;
a frustoconical burr having an external surface;
an internal bore of the frustoconical burr that extends from a top end to a bottom end, the internal bore having an upper cylindrical surface adjacent the top end, and an interlocking portion adjacent the bottom edge, the upper cylindrical surface being coaxial with the axis of the shaft, the interlocking portion having a side surface which is tapered with respect to the axis of the shaft;
an interlocking plug shaped to extend through the internal bore of the frustoconical burr, the interlocking plug having an upper cylindrical portion that fits through the upper cylindrical surface, and a lower portion that includes a sidewall surface which is also tapered with respect to the axis of the shaft, such that the sidewall surface interlocks with the side surface of the frustoconical burr; and
an adjustment knob that engages the end of the shaft for locking the interlocking plug within the frustoconical burr.

11. A coffee grinder comprising:
a tubular housing that includes a ring burr having a first plurality of curved teeth;

a shaft extending through the ring burr, the shaft having an axis, an interlocking feature, and the shaft extends to an end that has an externally threaded outer surface;

a grinding assembly operably mounted on the shaft, the grinding assembly comprising:

a frustoconical burr having an external surface, and an internal bore that extends from a top end to a bottom end, the external surface having a second plurality of curved teeth;

the internal bore having an upper cylindrical surface adjacent the top end, and an interlocking portion adjacent the bottom edge, the upper cylindrical surface being coaxial with the axis of the shaft, the interlocking portion having a plurality of receivers which each include a side surface and a top surface, the side surface of each of the receivers being angled with respect to the axis of the shaft;

an interlocking plug shaped to extend through the internal bore of the frustoconical burr, the interlocking plug having an upper cylindrical portion that fits through the upper cylindrical surface, and a lower portion that interlocks with the interlocking portion of the frustoconical burr;

a mating feature of the upper cylindrical portion of the interlocking plug that engages the interlocking feature of the shaft to prevent rotation of the interlocking plug with respect to the shaft, so that rotation of the shaft causes the interlocking plug to also rotate;

a plurality of interlocking feet of the lower portion of the interlocking plug that each extend radially and interlock with one of the receivers of the frustoconical burr;

each of the interlocking feet having a top surface and a sidewall surface, the sidewall surface being angled with respect to the axis of the shaft such that the sidewall surfaces of the interlocking feet together engage the side surfaces of the plurality of receivers of the frustoconical burr to securely lock the frustoconical burr onto the interlocking plug and prevent lateral movement of the frustoconical burr with respect to the interlocking plug interlocking plug, and such that the top surfaces of the interlocking feet do not contact the frustoconical burr; and an adjustment knob that has an internally threaded aperture that threadedly engages the externally threaded outer surface of the shaft for locking the interlocking plug within the frustoconical burr, and the frustoconical burr within the ring burr.

* * * * *